Nov. 8, 1927.
C. R. BUMBARGER
1,648,673
FASTENING DEVICE
Filed July 13, 1926
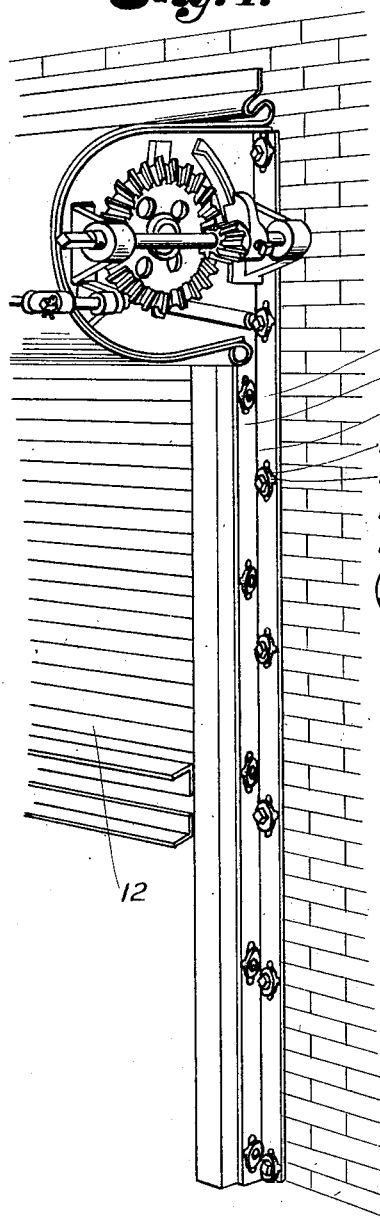
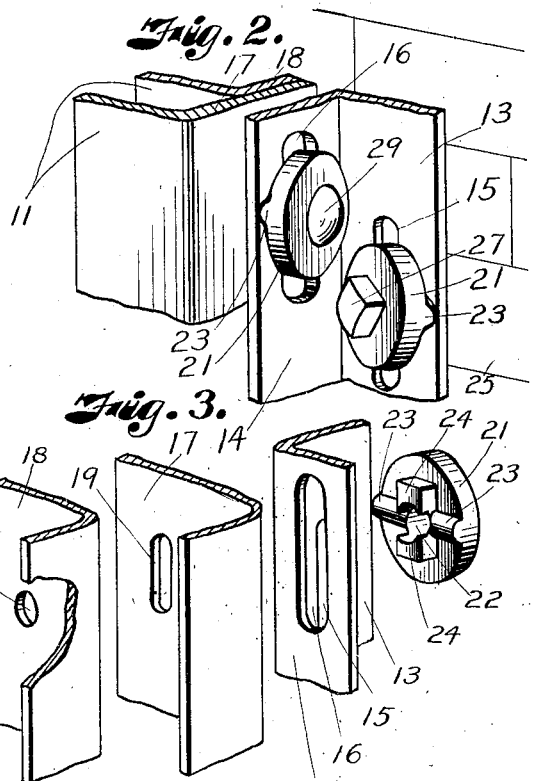
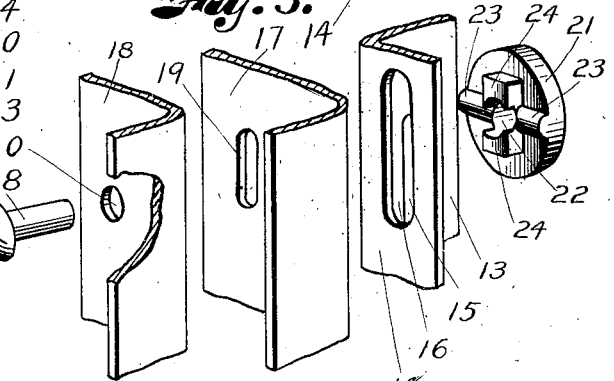
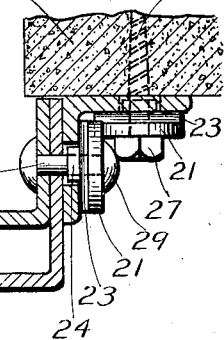
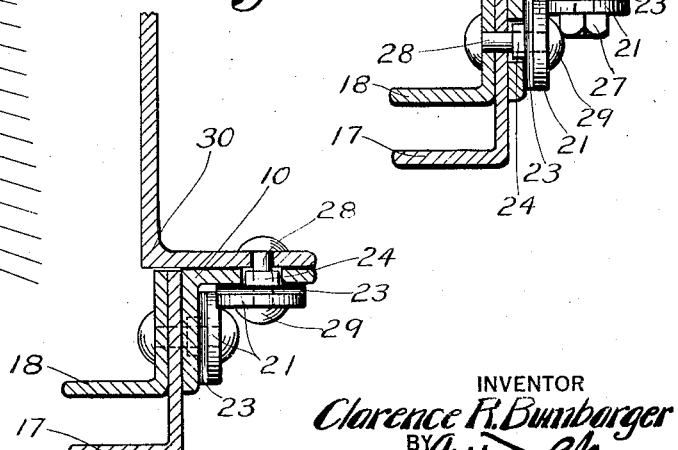
INVENTOR
Clarence R. Bumbarger
BY
ATTORNEY Patented Nov. 8, 1927.

1,648,673

UNITED STATES PATENT OFFICE.

CLARENCE R. BUMBARGER, OF KANSAS CITY, MISSOURI, ASSIGNOR TO GEORGE W. JOHNSON MANUFACTURING COMPANY, OF KANSAS CITY, MISSOURI, A CORPORATION OF MISSOURI.

FASTENING DEVICE.

Application filed July 13, 1926. Serial No. 122,190.

My invention relates to fastening devices and more particularly to fastening devices used in connection with fire doors.

It is important in the mounting of fire doors to provide guiding means therefor, that will not become warped or twisted out of shape so that the door will not move readily in the guides after the same have been subjected to heat. Frequently such warping is of such a serious character that it is necessary to replace the guide for the doors in order to make the doors operate properly. It is, accordingly, a purpose of my invention to provide means for securing a frame member, carrying a guide member, to said guide member and to a support, such as a wall, so that the frame member and guide member may expand in the direction of their length without interference with such expansion by the fastening means, the fastening means at the same time firmly securing the parts in position.

It is more particularly a purpose of my invention to provide means for fastening a frame member to a guide member and to a support that is adapted to pass through slots in said frame member, said fastening means preferably comprising a member extending through the slot and a clamping member engaging with a head on the member passing through the slot and with the frame member to clamp the frame member to a support and to a guiding member, said clamping member preferably comprising a washer having rounded ribs thereon engaging with the frame member and guide projections entering the slot. The rounded ribs firmly clamp against the frame member but, due to the rounded form thereof, permit the frame member to move relative to the fastening means so that the frame member is permitted to expand relative to its support without buckling or warping, and the guide and frame members are permitted to move relative to each other under expansion.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a perspective view of a portion of a wall and fire door, showing my improved fastening means applied thereto.

Fig. 2 is a fragmentary view, partly in perspective and partly in section, of a frame and guide member and the adjoining wall, showing my improved fastening device in position.

Fig. 3 is a fragmentary perspective view of the guide and frame members and the fastening means, separated.

Fig. 4 is a transverse sectional view of a portion of a wall and frame and guide members secured thereto, and Fig. 5 is a view similar to Fig. 4, of a modification.

Referring in detail to the drawings:

My improved fastening device is shown as being applied to an angular frame member 10 that supports the guide members 11 for guiding the fire door 12 in its movements. The legs 13 and 14 of the angle member 10 are provided with slots 15 and 16, and the angular guide members 11 are provided with legs 17 and 18, the leg 17 being longer than the leg 18 to space the guiding portions of the members 11 from each other a sufficient distance to accommodate the door 12 and being provided respectively with the slot 19 and the opening 20.

My improved fastening means comprises washers 21 which are substantially flat on one face thereof and which have the central openings 22. The other face of the washers is preferably provided with a pair of rounded ribs 23 which extend from the outer edge of each of the washers to the central opening 22 and are preferably in alignment. Intersecting the ribs 23 is a pair of rectangular guide projections 24 which are also preferably in alignment and which are provided with side faces extending substantially at right angles to the adjoining face of the washer, thus providing guiding means for the washer in the slots 15 and 16, the width of the projections 24 being substantially the width of the slots 15 and 16. In securing the angular frame member 10 to a wall or other support 25, any suitable securing means such as the screws 26 having the heads 27 may be used, the screws passing through the openings 22 and the slots 15 and clamping the ribs 23 against the leg 13 of the angular member 10. To secure the members 11 to the flange or leg 14 of the member 10 a rivet 28 is passed through the opening 20 and the slot 19 and each of the slots 16, and a washer 21 is engaged with each of the rivets, the rounded ribs 23 being in engagement with the leg 14 of the angular frame member 10. The rivet is then headed over to provide the head 29 thereon, thus clamping the washer 21 in position between the head 29 and the member 14.

When the wall to which the device is to be applied is provided with a metallic corner piece, a rivet 28' may be employed for securing the angular metallic corner piece 30 and the angular member 10 together as shown in Fig. 5, the parts being otherwise the same as shown in Figs. 1 to 4 inclusive.

It will be seen that while the fastening means employed clamps the flanges or legs 14, 17 and 18 firmly together and firmly secures the angular member 10 to its support, said securing means will permit the expansion of the members 10 and 11 relative to each other and relative to the wall or other support upon which the member 10 is mounted, such as would occur under heat. Thus, the warping or buckling of either the member 10 or the guide forming members 11 will be avoided, as these are free to expand under the action of heat and to return to their original condition upon contracting during cooling thereof.

What I claim and desire to secure by Letters Patent is:—

1. In a device of the character described, a frame member having slots therein, and securing means for said frame member comprising means extending through said slots, said means having each a head thereon, and a member mounted on said means between said head and said frame member having means thereon engaging said frame member to clamp the same in place but permitting movement of said frame member lengthwise of itself relative to said securing means.

2. In a device of the character described, a frame member having slots therein, and securing means for said frame member comprising means extending through said slots, said means having each a head thereon, and a member mounted on said means between said head and said frame member having ribs thereon engaging said frame member to clamp the same in place but permitting movement of said frame member lengthwise of itself relative to said securing means.

3. In a device of the character described, a frame member having slots therein, and securing means for said frame member comprising means extending through said slots, said means having a head thereon, and a member mounted on said means between said head and said frame member having ribs thereon engaging said frame member to clamp the same in place but permitting movement of said frame member lengthwise of itself relative to said securing means, and having means engaging in said slots to hold said ribbed members from rotation relative to the frame member.

4. In a device of the character described, a frame member having slots therein, and securing means for said frame member comprising means extending through said slots, said means having each a head thereon, and a member mounted on said means between said head and said frame member having ribs having rounded surfaces thereon engaging said frame member to clamp the same in place but permitting movement of said frame member lengthwise of itself relative to said securing means.

5. A clamping washer having a rounded rib on one face thereof and guide projections on said washer.

6. A clamping washer having a rounded rib on one face thereof and guide projections on said washer extending transversely of said rib.

7. A clamping washer having a central opening, a pair of rounded aligning ribs and a pair of aligning guide members projecting from one face of said washer, said guide projections extending substantially at right angles to said ribs.

In testimony whereof I affix my signature.

CLARENCE R. BUMBARGER.